(12) United States Patent
Greener et al.

(10) Patent No.: US 7,979,347 B1
(45) Date of Patent: Jul. 12, 2011

(54) AUTOMATED ONLINE SALES RISK MANAGEMENT

(75) Inventors: Sharon Greener, Rumson, NJ (US);
Mark Higgins, New York, NY (US);
Effie Konstantine Anagnostopoulos, New York, NY (US); Paul Young, New York, NY (US); Dan Rothman, New York, NY (US); John Godfrey, London (GB); Mel Gunewardena, New York, NY (US)

(73) Assignee: Goldman Sachs & Co., New York, NY (US)

( * ) Notice: Subject to any disclaimer, the term of this patent is extended or adjusted under 35 U.S.C. 154(b) by 587 days.

(21) Appl. No.: 09/714,315

(22) Filed: Nov. 16, 2000

Related U.S. Application Data

(63) Continuation-in-part of application No. 09/702,956, filed on Oct. 31, 2000, now Pat. No. 6,829,590, which is a continuation-in-part of application No. 09/526,606, filed on Mar. 16, 2000, now Pat. No. 7,024,383.

(60) Provisional application No. 60/218,184, filed on Jul. 14, 2000.

(51) Int. Cl.
*G06Q 40/00* (2006.01)

(52) U.S. Cl. .......................................................... 705/39

(58) Field of Classification Search .................... 705/35, 705/53, 80, 26, 37, 44, 36–40
See application file for complete search history.

(56) References Cited

U.S. PATENT DOCUMENTS

| | | | |
|---|---|---|---|
| 3,652,795 A * | 3/1972 | Wolf et al. | 379/91.01 |
| 4,251,867 A * | 2/1981 | Uchida et al. | 705/39 |
| 5,262,942 A | 11/1993 | Earle | |
| 5,305,200 A * | 4/1994 | Hartheimer et al. | 705/37 |
| 5,557,518 A | 9/1996 | Rosen | |
| 5,774,553 A * | 6/1998 | Rosen | 705/68 |
| 5,787,402 A * | 7/1998 | Potter et al. | 705/37 |
| 5,802,502 A * | 9/1998 | Gell et al. | 705/37 |
| 5,832,462 A * | 11/1998 | Midorikawa et al. | 705/35 |
| 5,842,178 A * | 11/1998 | Giovannoli | 705/26 |

(Continued)

FOREIGN PATENT DOCUMENTS

EP 1197887 4/2002

(Continued)

OTHER PUBLICATIONS

Currenex web site, <http://www.currenex.com>; Homepage, <http://www.currenex.com/home.html> Foreign Exchange Market, <http://www.currenex.com/foreign.html> About Currenex, <http://www.currenex.com/about.html> FAQ, <http://www.currenex.com/faq.html> FX Trade Services, <http://www.currenex.com/services.html>.

(Continued)

*Primary Examiner* — Olabode Akintola
(74) *Attorney, Agent, or Firm* — Chadbourne & Parke LLP; John A. Squires

(57) ABSTRACT

The present invention contemplates a risk management system for facilitating an e-commerce transaction wherein the participants to the transaction engage in commerce using different currencies. An automated sales risk management system facilitates a transaction by providing a price of a transaction which incorporates aggregated costs related to the transaction into a price made available to the participants. A currency risk management system can receive an amount relating to a deliverable involved in a transaction and determines an aggregated cost of the transaction. Aggregated cost can include a cost of credit, a cost for exchange of currency, a cost of insurance, processing fees, or other associated costs. Insurance can be monitored and a determination can be made regarding whether a participant has adequate insurance to cover a proposed transaction. The present invention also provides for risk associated with online transactions to be categorized and transferred.

17 Claims, 7 Drawing Sheets

U.S. PATENT DOCUMENTS

| | | | | |
|---|---|---|---|---|
| 5,862,223 | A | * | 1/1999 | Walker et al. .................... 705/50 |
| 5,884,274 | A | * | 3/1999 | Walker et al. ..................... 705/4 |
| 5,897,621 | A | * | 4/1999 | Boesch et al. ................... 705/26 |
| 5,905,974 | A | * | 5/1999 | Fraser et al. ...................... 705/37 |
| 5,924,082 | A | * | 7/1999 | Silverman et al. .............. 705/37 |
| 5,930,774 | A | * | 7/1999 | Chennault ....................... 705/36 |
| 5,963,923 | A | * | 10/1999 | Garber ............................ 705/37 |
| 5,969,974 | A | | 10/1999 | Vandenbelt et al. |
| 6,014,627 | A | | 1/2000 | Togher et al. |
| 6,058,379 | A | * | 5/2000 | Odom et al. .................... 705/37 |
| 6,125,355 | A | * | 9/2000 | Bekaert et al. .................. 705/36 |
| 6,128,598 | A | * | 10/2000 | Walker et al. ..................... 705/4 |
| 6,161,099 | A | * | 12/2000 | Harrington et al. ............. 705/37 |
| 6,205,433 | B1 | | 3/2001 | Boesch et al. ................... 705/26 |
| 6,249,770 | B1 | | 6/2001 | Erwin et al. |
| 6,269,345 | B1 | * | 7/2001 | Riboud ............................ 705/35 |
| 6,317,727 | B1 | | 11/2001 | May |
| 6,460,020 | B1 | * | 10/2002 | Pool et al. ....................... 705/26 |
| 2001/0027437 | A1 | | 10/2001 | Turbeville et al. |
| 2001/0042007 | A1 | * | 11/2001 | Klingle ............................ 705/14 |
| 2001/0056398 | A1 | | 12/2001 | Scheirer .......................... 705/38 |
| 2002/0016762 | A1 | | 2/2002 | Feilbogen et al. .............. 705/39 |
| 2002/0023053 | A1 | * | 2/2002 | Szoc et al. ....................... 705/39 |
| 2002/0046053 | A1 | | 4/2002 | Hare et al. ........................ 705/1 |
| 2002/0062278 | A1 | | 5/2002 | Ingram et al. |
| 2002/0152156 | A1 | | 10/2002 | Tyson-Quah |

FOREIGN PATENT DOCUMENTS

| | | | |
|---|---|---|---|
| GB | 2366020 | | 2/2002 |
| WO | WO 98/36368 | * | 8/1998 |
| WO | 01/44995 | | 6/2001 |
| WO | WO 01/98981 A1 | * | 12/2001 |
| WO | WO 02/11018 | | 2/2002 |

OTHER PUBLICATIONS

"CMGI and Netcentives Announces Strategic Infrastructure Alliance for Network-Wide, Online Points-Based Rewards Program", Business Wire, Apr. 10, 2000.

"Citigroup and America Online Announce Major Strategic Online Financial Alliance", Business Wire, Jul. 18, 2000.

"Citigroup, AOL in Major Strategic Alliance", AFX European Focus, Jul. 18, 2000, Company News.

"Citigroup, AOL Form Pact Allowing Cash to Be E-Mailed", The Wall Street Journal, Jul. 19, 2000, C23.

"Currenex Launches Multi-Bank Web Based FX Trading System", fxweek, May 1, 2000, vol. 11, No. 18.

"Netscape, Citibank Unveil Credit Card", Dow Jones News Service, Jan. 19, 2000.

Green, Meg, "Citigroup Credits Growing Business with 23% Second-Quarter Net Increase", BestWire, Jul. 19, 2000.

Green, Meg, "Citigroup, AOL Team Up to Sell Products Online", BestWire, Jul. 19, 2000.

Kraus, James R., "National/Global Forex Trading Sites May Erode Bank Revenues", The American Banker.com, May 4, 2000.

Mullen, Theo, "Service Aids Selling to Europeans", InternetWeek, Jul. 17, 2000, 13.

Power, Carol, "AOL Digs Deeper Into Virtual Financial World", The American Banker, Aug. 11, 1999, On-line Banking 1.

Power, Carol, "Citi Advances in Online Payments, Aggregation; Strikes Partnerships with AOL and Yodlee.com", The American Banker, Jul. 19, 2000, Technology 1.

Rogerson, Paul, "The Right to Choose", The Accountant, Aug. 1, 1999, 12.

Tompor, Susan, "Does it Make Sense to Spread the Wealth Around?", The Florida Times-Union, Jul. 11, 1999, H1.

Wilkinson, Claire, "Insurance Review: Citigroup in AOL Online Alliance Plan", Lloyd's List, Jul. 21, 2000, 8.

International Search Report for PCT/US01/21812 dated Oct. 18, 2001.

Int'l Search Report dated Sep. 19, 2002 for PCT/US01/51200.

* cited by examiner

306 → Asking $1,000,000 USD

|  | Local Currency | FX Rate | Price in USD |
|---|---|---|---|
| 301 European buyer | 1,020,000 | 0.9588 USD/EUR | 977,976 |
| 302 Korean Buyer | 1,093,272,200 | 1110 KRW/USD | 984,930 |
| 303 Australian Buyer | 1,600,000 | .6000 AUD/USD | 960,000 |
| 304 Canadian Buyer | 1,400,000 | 1.4575 CAD/USD | 960,549 |
| 305 British Buyer | 625,000 | 1.5850 USD/GBP | 990,625 |

|  | Local Currency | FX Rate | Price in USD |
|---|---|---|---|
| 316 European Seller | 1,500,000 | 0.9588 USD/EUR | 1,438,200 |
| 317 Korean Seller | 1,100,000,000 | 1110 KRW/USD | 990,991 |
| 318 Australian Seller | 1,750,000 | .6000 AUD/USD | 1,050,000 |
| 319 Canadian Seller | 1,600,000 | 1.4575 CAD/USD | 1,097,770 |
| 320 British Seller | 620,000 | 1.5850 USD/GBP | 982,700 |

AUTOMATED ONLINE SALES RISK MANAGEMENT

CROSS REFERENCE TO RELATED APPLICATIONS

This application is a continuation-in-part of a prior continuation-in part application entitled "Enhanced Online Sales Risk Management System," filed Oct. 31, 2000 and bearing the Ser. No. 09/702,956 (now U.S. Pat. No. 6,829,590), which is a continuation-in-part of U.S. patent application Ser. No. 09/526,606 entitled "Online sales risk management system" filed on Mar. 16, 2000 (now U.S. Pat. No. 7,024,383), which claims the benefit of U.S. Provisional Application Ser. No. 60/218,184 entitled "Enhanced online sales risk management system," filed on Jul. 14, 2000. The entire contents of the aforementioned applications are hereby incorporated by reference.

BACKGROUND

A risk management system has been previously described whereby an e-commerce participant can have relevant sales information, such as requested purchase price, current bid, highest bid, etc. displayed in the currency local to that e-commerce participant. It has also been provided that the information displayed is formulated using a base currency, and an exchange price relative to that base currency. It will be known by those in the art that should either the base currency or the exchange price fluctuate, then the price information displayed in local currency to the e-commerce participant will also fluctuate. If the price information is displayed in real time, such fluctuations could cause the displayed information to change often, possibly continually. Such a display is not conducive to completing business transactions. Frequent fluctuation in the price displays may be disconcerting for the e-commerce participant, and may make it difficult for the e-commerce participant to determine which of the various options is the most favorable. Thus, it is desirable to have a risk management system that eliminates at least a portion of the price fluctuations.

International e-commerce is forecasted to substantially increase in the immediate future. It is possible that e-commerce will account for almost 10% of global sales of goods and services within the next several years. Business to business (B2B) transactions will most likely constitute the majority of that figure. One important benefit of B2B e-commerce is the degree to which it expands a company's "potential" client base to markets across the globe. Consequently, international or global e-commerce may ultimately account for a majority of e-commerce transactions.

In the evolving e-commerce market, few transaction mediums have considered the large currency transactions associated with this new form of international trade, let alone ways of hedging the foreign exchange (FX) risk associated with such transactions. As B2B commerce evolves over the next several years, both regional e-business communities and existing cross-border B2B players will capitalize on the opportunity to dramatically increase their client base and revenues by expanding into global markets. While issues such as security, trade management, and taxation have been addressed by B2B players as they begin their international initiatives, foreign exchange has largely been ignored. This is despite the fact that FX market volatility can markedly change the price of goods sold on the internet, alter the terms of trade agreements, and even be the determining factor as to whether a transaction occurs between two parties.

Increased use of the Internet and other dispersed computer communications networks by commerce participants has also resulted in an increase in the number of transaction facilitators operating on such networks. Transaction facilitators can assist commerce participants in finding and negotiating with other commerce participants such that transactions can be completed. Transaction facilitators can take many forms, such as an internet portal, or even a traditional brick and mortar establishment.

Generally, the transaction facilitator provides a medium through which a purchaser or a seller can make its goods and services known to a potential seller and purchaser, respectively. For example, a facilitator may be a website where a seller posts information regarding their product, including price information. Interested purchasers may then visit the website and view the product and sales information for multiple sellers. From this information, the purchaser may complete the transaction with the seller which has the most favorable terms. It is known that the converse situation can similarly occur whereby the purchaser posts information related to the product sought and terms of purchase, and potential sellers review the bid information to select the transaction with the most favorable terms. An example of such a portal is EBay®, whereby potential buyers and sellers post information on the Ebay® website, and the commerce participants are able to determine which option is the most desirable. Another example would include a business to business (B2B) online exchange. An e-commerce transaction facilitator provides a marketplace where a potential purchaser and a potential seller can negotiate and consummate an e-commerce transaction.

It is known for a transaction facilitator to obtain payment from one of the commerce participants each time a transaction is completed. Therefore, it is beneficial to the transaction facilitator to complete as many transactions as possible. Thus, transaction facilitators want to provide the commerce participants with all the information they need to complete the transaction.

Pricing and other financial information can be a key factor in the completion of a transaction. It is beneficial for the transaction facilitator to be able to provide price and other information to each of the commerce participants. In particular, it is beneficial for the transaction facilitator to provide price and other financial information to the commerce participants in a currency local to the commerce participants. As disclosed in another embodiment of this invention, such information can then be displayed either individually or collectively, such that the commerce participant can select the most beneficial transaction.

Providing pricing information in the local currency of the commerce participants can be difficult if the commerce participants engage in commerce using different currency. For example, if the seller engages in commerce in a first currency, the purchaser in a second currency, and the transaction facilitator in a third currency, the transaction facilitator must be able to provide the relevant information in all three currencies. It will be appreciated that given the number of currencies used in the global economy, most transaction facilitators are ill-equipped to provide such financial information and services.

Business to customer (B2C) and B2B commerce, including regional e-business communities and existing cross-border players will capitalize on the opportunity to dramatically increase their client base and revenues by expanding into global markets. While issues such as security, trade management, and taxation have been addressed by e-commerce players in their international initiatives, foreign exchange has largely not been satisfactorily addressed. FX market volatility can markedly change the price of goods sold on the internet, alter the terms of trade agreements, and even be the determining factor in whether a transaction occurs between two parties. E-commerce sites interacting internationally would benefit by transparently embedding the inherent foreign exchange conversion into all their commercial transactions. What is needed is a Foreign Exchange (FX) pricing platform which will enable sites to show prices to each participant in the participant's local currency. When a transaction is executed, the necessary foreign exchange trade should automatically be conducted so that both a purchaser and a seller transact in their own local currencies.

It would be beneficial to have a risk management system which can provide price and other financial information in the local currencies for each of the purchaser, seller and transaction facilitator. In particular, the risk management system should be able to perform risk management services when a first commerce participant uses a first currency, a second commerce participant uses a second currency, and a transaction facilitator uses a third currency. It would further be beneficial to provide a system whereby the commerce participants and the transaction facilitator can view the financial information in a currency local to one or more of the other participants in the transaction.

SUMMARY

Accordingly, the present invention contemplates a risk management system for facilitating an e-commerce transaction wherein the participants to the transaction engage in commerce using different currencies. An automated sales risk management system facilitates a transaction by providing a price of a transaction which incorporates aggregated costs related to the transaction into a price made available to the participants. A currency risk management system receives an amount relating to a deliverable involved in a transaction and determines a cost for credit to be extended to a buyer. Credit can be extended resultant to the transaction. A cost for exchange of currency relating to the transaction can be calculated and included in a price for the deliverable, such that the price will include an aggregate of the cost of credit involved in the transaction, the cost for exchange of currency relating to the transaction, and the amount relating to the deliverable. In addition, the currency risk management system can transmit a calculated price to a participant via a network access device.

Cost for the exchange of currency can include a volume discount term relating to an aggregate notional volume associated with a participant of the transaction. The notional volume can be calculated on a periodic basis. The cost of exchange of currency can also be discounted according to a volume discount term relating to an aggregate number of transactions associated with a participant of the transaction, and/or a payment history associated with a participant of the transaction.

In one embodiment, the present invention can determine an exchange price according to a tolerance parameter for a foreign currency in which the amount relating to the deliverable is denominated. The exchange price can relate the foreign currency to a base currency and receive a spot price relating to exchange of a foreign currency. If the spot price exceeds the tolerance parameter, the exchange can be renegotiated. A set exchange price can also be made valid for a predetermined time period for which the exchange price has been set. Accordingly, if the transaction will take place during the predetermined time period, the set exchange price can be applied.

This invention can also facilitate an online transaction by entering an amount of insurance available to an insured participant. The insurance can relate to non-payment by the insured participant. The currency risk management system can receive a price and/or other information descriptive of an online transaction involving the insured online participant. In turn it can confirm that the insurance available to the insured participant is sufficient to guarantee payment of the purchase price.

Another aspect of the current invention provides for a purchase price to be converted from a denomination in a first currency associated with the transaction into a denomination in a second currency associated with the insurance. Alternatively, payment process can include a purchase amount that is converted from a denomination in a first currency associated with the transaction into a denomination in a second currency associated with payment terms.

Still another aspect of the present invention provides for payment to be processed after receipt of notification of shipment of a deliverable. For example, notification can originate from a system related to processing of international customs and shipping arrangements.

Another embodiment of the present invention includes receiving information relating to a credit application for a participant of an online transaction. The credit application can be assigned to a risk category. A foreign exchange price can thereby be calculated for an amount relating to the online transaction such that a risk category is considered in calculating the foreign exchange price. The credit application can also be categorized according to a rule set in the currency risk management system. Risk associated with one or more credit applications assigned to a risk category can be aggregated and the aggregated risk can be insured. Credit terms can be issued based upon the participant's assigned risk category. In addition, the aggregated risk can be transferred according to well known methods of marketing risk.

The present invention can also be configured to limit risk associated with fluctuations in a currency price offered by a currency exchange institution to an e-commerce participant. Fluctuations in currency price can be caused, for example, by fluctuations in the market or spot price of the currency. The currency exchange institution can limit risk associated with such fluctuation by setting the currency price at a specified rate and adjusting the specified rate if delta between the market price and the specified rate exceeds a predetermined threshold. The currency exchange institution can then monitor the market price of the relevant currency, and if market price exceeds a certain tolerance that is either above or below the specified rate, the currency price can be re-negotiated. Re-negotiation of the currency price may take place in any means set forth by the parties, for example in face-to-face discussions, by telephone, by email, or automatically by a computer according to agreed upon terms.

Functions associated with tolerance initiated price negotiation including the monetary conversions, periodic monitoring of spot price, comparison with set parameters, and adjustment of the set currency price can be performed by a currency exchange risk management system. Additionally, the currency exchange institution can monitor the spot price continuously or at various time intervals and either alert interested parties when the tolerance is exceeded, or automatically adjust the specified rate according to a predetermined algorithm. The present invention thereby accounts for fluctuations in the market price of the relevant currency and provides stability for the currency price within a given range.

In another aspect, the present invention can include a computer system for providing risk management relating to online transactions. A computer server can be made accessible with a network access device via a communications network; and executable software can be stored on the server and be made executable on demand via the network access device. Software operative with the server can be utilized to determine a transaction price.

Other embodiments can include a computer executable program code residing on a computer-readable medium or a computer data signal embodied in a digital data stream. Various features and embodiments are further described in the following figures, drawings and claims.

DESCRIPTION OF THE DRAWINGS

FIGS. 3a and 3b illustrate exchange rate interfaces.

DETAILED DESCRIPTION

The present invention contemplates a risk management system 113 for facilitating an e-commerce transaction wherein the participants to the transaction engage in commerce using multiple currencies. In particular, the invention contemplates three parties to the transaction, a seller 110, a transaction facilitator 111 and a purchaser 112. The transaction facilitator 111 may be a web portal, a brick and mortar establishment, or any other commerce participant whose role in the transaction is to bring the seller 110 and purchaser 112 together such that they may complete a transaction.

A currency exchange institution can limit risk associated with currency price fluctuations by monitoring spot price of a given currency, and modifying an exchange price for that currency when the spot price exceeds predetermined limits. In particular, the currency exchange institution can negotiate a mechanism for determining a currency exchange price with an e-commerce participant and implement the mechanism through an automated system. For example, a mechanism can include a tolerance level. The tolerance level can be negotiated by a currency exchange institution and an e-commerce participant. Under this embodiment of the invention, when an associated spot price either exceeds or falls below the negotiated tolerance level, the currency price can be modified accordingly.

Figure 1:
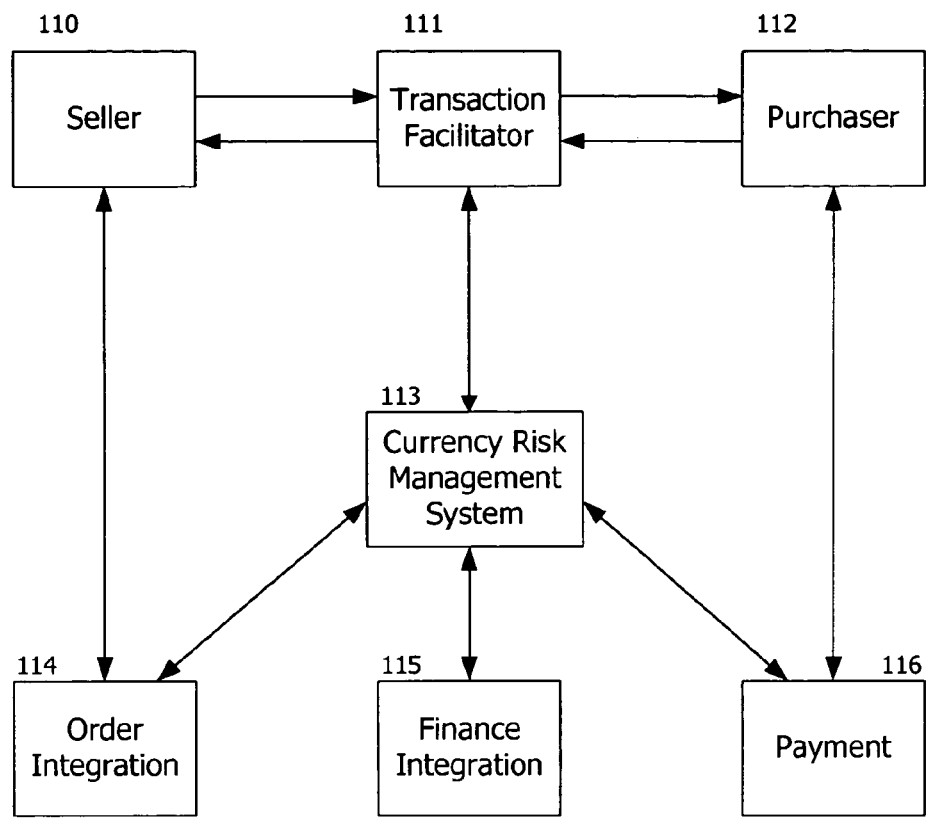
FIG. 1 illustrates block components which can embody this invention.

Referring to FIG. 1, a risk management system 113 enables a purchaser, seller and transaction facilitator 111 to share and exchange financial information related to a transaction, where each participant conducts commerce in distinct currencies. The risk management system 113 interacts with the transaction facilitator 111 and transaction participants to provide the necessary currency conversion. In one embodiment, the risk management system 113 can be provided by a financial institution, such as a bank.

A transaction facilitator 111 is connected to a dispersed network communications system. The transaction facilitator 111 can operate a medium, such as an internet website, whereby other computers that are part of the network communications system can send and retrieve information related to commercial transactions. For example, a seller 110 can use a computer to send information related to certain products or services he wants to sell. If the seller is located, for example, in Japan then the information displayed on his computer and the information sent to the transaction facilitator 111 will be in Japanese Yen. Such information can be received by the transaction facilitator 111 and posted on its website. If the transaction facilitator 111 is located in the United States, the transaction facilitator 111 may prefer to view and post this information in U.S. Dollars. When the information is received in Yen, the transaction facilitator 111 then sends such information to the currency exchange system, in the manner provided heretofore. The currency exchange system converts the financial information from Yen to Dollars, and transmits the converted information to the transaction facilitator 111 for display on the website.

Parties interested in the products or services being offered can then go the website and retrieve the information related to a commerce participant's offering. For example, a purchaser 112 can go to the website and retrieve such information. If the purchaser were located in Europe, he preferably would view such information in Euros. The purchaser would inform the transaction facilitator 111 of, either automatically through his computer settings or as a selection on the website, the currency in which the purchaser would like to view the information. Once the transaction facilitator 111 has received such information, the transaction facilitator 111 can contact the currency exchange system. The currency exchange system would then convert the financial information from Dollars to the selected currency of the purchaser, in this case Euros, and then transmit the information back to the transaction facilitator 111. The transaction facilitator 111 could then send such information to the purchaser for viewing in Euros.

It will be apparent to those in the art that the risk management system 113 provided will allow all commerce participants and potential commerce participants to view the relevant financial information in the currency of their choice. Additionally, the commerce participants could choose to view the financial information in currencies other their own local currency, or in multiple currencies. Thus, the system allows a commerce participant 110, 112 to view the relevant financial information in the commerce participant's 110, 112 own local currency, in the currency of another commerce participant 110, 112, in the currency of the transaction facilitator 111, in a previously unmentioned currency, or in several currencies at once. The present invention can thereby facilitate a commerce participant's 110, 112 choice of which transactions will best fulfill its needs.

For example, should the purchaser 112 be located in Japan, the seller 110 in Europe, and the financial institution in the United States, the risk management system 113 can make the requisite currency conversions and display the information in the currency local to each party. The system described herein performs two transactions, converting the pricing information from the seller in Euros to U.S. Dollars, and then from U.S. Dollars to Japanese Yen for display to the purchaser 112. Similarly, purchase information transmitted from the purchaser 112 to the seller also requires two transactions, i.e., conversion from Japanese Yen to U.S. Dollars, and then from U.S. Dollars to Euros for display to the seller. In this manner, each party to the transaction can review the sale information in their own local currency.

A full scale e-purchasing solution according to the present invention can include transaction payment and settlement, credit evaluation and clearing, and fulfillment services. E-financing services can be dependent on each other and be integrated with each other thereby adding value as a full-scale financing solution. The present invention includes a full-scale offering which can provide a solution for back-end steps, front-end steps in the e-procurement chain, exploration, negotiation and ordering.

A first step can include integrating financing, escrow, insurance, and credit products into an e-commerce infrastructure that offers alternative forms of payment guarantees. The e-finance solution of the present invention can address a variety of risks including market risk of a purchaser 112 and/or a seller 110, short-term exposure to a single entity in a one-to-many model, and commercial performance risk.

A second step can include integrating orders into a system of fulfillment functions including invoicing, shipping documents, and customs clearances. This system can also be enhanced with standardized document exchange across systems. In addition, an integrated offering can provide solutions for linking FX to delivery of goods thereby addressing delay or failure to deliver goods. Delay or failed delivery can affect market risk as payment may not be made on contractual settlement date.

A third step can encompass payment. International transactions can utilize automatic, bundling of foreign exchange pricing and risk-transfer solutions. An international pricing platform can tie into other steps in back-end of the procurement chain, including credit evaluation, trade financing, logistics, and transaction settlement. In particular, an international pricing platform can include payments which tie into ACH and other EFT networks that work across banks. In addition, payment repudiation can be addressed as the ACH payment mode allows significant time to pass before a purchaser 112 is completely unable to call back payment. Therefore the frequency of call-back can be analyzed to gauge materiality of increased risk.

A transaction participant can integrate accounts payable systems with web-initiated payment messages. Transaction participants can thereby reconcile services that match data transmitted throughout market sites to banks, and data in accounts payable and receivable systems. In one embodiment, a seller 110 can offer a purchaser 112 special payment terms that depend on financing relationships.

A transaction facilitator 111 can be connected to a dispersed network communications system, such as the Internet, an intranet or a private network. The transaction facilitator 111 can operate an interactive medium, such as a website, graphical user interface (GUI) or other network interface. A user with a network access device, such as a computer can access the network interface to send and retrieve information related to transactions. For example, a seller 110, or other commerce participant, can use a computer to send information related to certain products or services he wants to sell. If the seller 110 is located, for example in Japan, then the information displayed on the seller's computer and the information sent to the transaction facilitator 111 will be in Japanese Yen. Such information is received by the transaction facilitator 111 and posted on its website. If the transaction facilitator 111 is located in the United States, the transaction facilitator 111 may prefer to view and post currency information in U.S. Dollars. Information received in Yen can be routed through the currency exchange system in a manner consistent with those provided heretofore. The currency exchange system converts the financial information from Yen to Dollars, and transmits the converted information to the transaction facilitator 111 for display on the website, or other interface.

Parties interested in products or services being offered by a commerce participant can access a website supported by the participant and retrieve the information related to a commerce participant's offering. The information retrieved can be tailored to the preferences of an interested party. For example, if the party is a purchaser located in Europe, the purchaser may prefer to view such information in Euros, or a local currency. The purchaser can indicate to a transaction facilitator 111 their viewing preferences or relay such information directly to a currency exchange system. Indications, including the currency in which the purchaser would like to view the information, can be made via computer settings, such as in a user profile, or via interaction with a user interactive website. The transaction facilitator 111 can also relay the information to the currency exchange system. The currency exchange system can convert financial information from one currency according to a predetermined arrangement, such as from Dollars to Euros, or other selected currency of the purchaser at a predetermined price. The currency exchange system can also transmit the information back to the transaction facilitator 111, in which case the transaction facilitator 111 can provide the Euros information to the purchaser for viewing.

It will be apparent to those in the art that the risk management system 113 provided will allow all commerce participants and potential commerce participants to view relevant financial information in the currency of their choice. Additionally, the commerce participants can choose to view financial information in currencies other than their own local currency, or in multiple currencies. Thus, the system allows a commerce participant 110, 112 to view financial information in their own local currency, in the currency of another commerce participant 110, 112, in the currency of the transaction facilitator 111, in a previously unmentioned currency, or in several currencies at once. Through this system, the commerce participants can choose parameters relating to a transaction which best fulfill the participant's needs.

Figure 2:
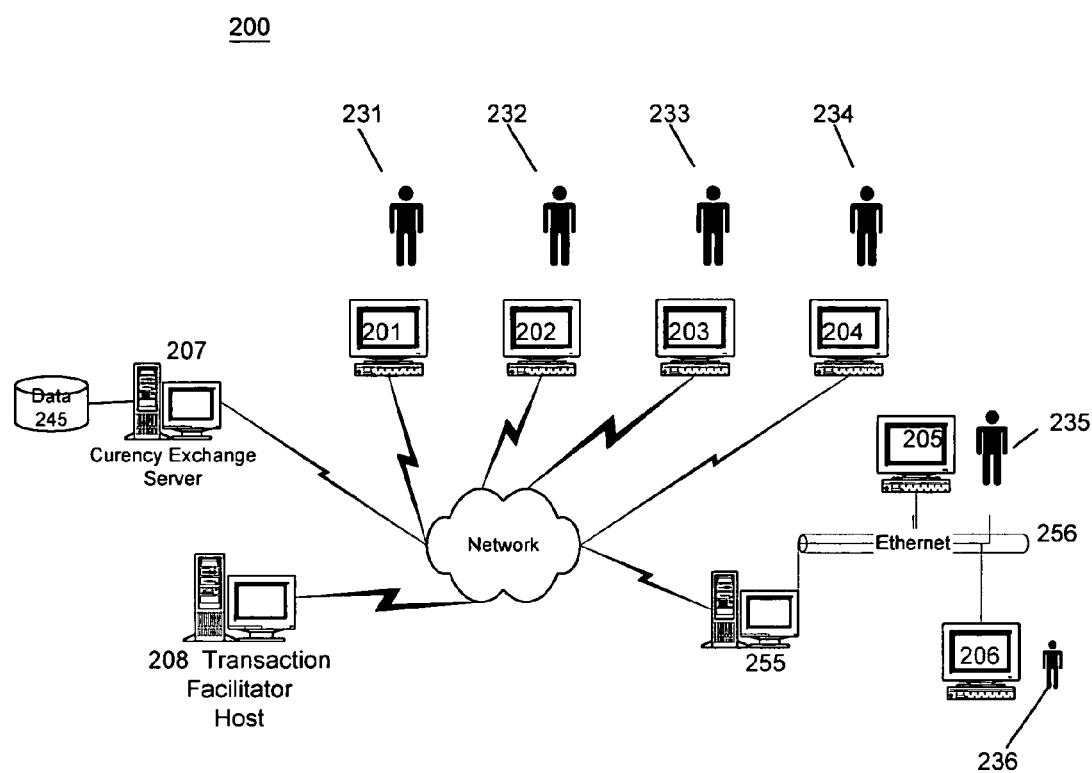
FIG. 2 illustrates a network on computer systems that can embody an enhanced online sales risk management system.

FIG. 2 shows a network of computers 200 that may be used in one implementation of an on-line sales risk management system 100. The network 200 can include a transaction facilitator system 208 and exchange system participant network access devices 201-206. Each of the network access devices can include a processor, memory, a user input device, such as a keyboard and/or mouse, and a user output device, such as a video display and/or printer. The exchange system participant network access devices 201-206 can communicate with the transaction facilitator system 208 and currency exchange server 207 to obtain information stored as data on a storage medium 245 at the currency exchange server 207. In addition, a participant 231-236 operating a network access device 201-206 may complete a transaction with a transaction facilitator system 208.

A transaction facilitator system 208 may include multiple processing and database sub-systems, such as cooperative or redundant processing and/or database servers which can be geographically dispersed throughout the network 200. In some implementations, two or more customer computers 205-206 may communicate with other nodes 201-208 through a local network 256. The local network 256 can also include a local server 255 such as a proxy server or a caching server.

In general, the participants will communicate with a currency exchange risk management system 113. The currency exchange system will log sales data from sales transactions and apply the predetermined currency price for the predetermined time schedule. In addition, the currency exchange risk management system 113 can calculate a risk exposure based upon sales volume and market data. In one embodiment, the calculation for risk exposure is performed for a given currency, using an aggregate of sales transacted in that currency. In another embodiment, the calculation for risk exposure can be performed on a sum of the aggregate sales for all currencies. Other risk calculations can also be performed and are within the scope of this invention.

Currency price can be programmed according to almost any criteria that serves the parties involved. For example, a price can be set for a predetermined period of time or relative to an upper and lower limit of a currency spot price. A price set relative to an upper and lower limit of the spot price can utilize a formula for determining when the currency price should be reset. Pricing can be set according to a negotiation by interested parties, or simply recalculated according to a predetermined formula.

One algorithm that can be used to determine if a price needs to be reset can be represented as follows:

$$X=Y \text{ if } A \leq z \leq B$$

wherein:
X is the currency price;
Y is the currency price negotiated by the financial exchange institution and the e-commerce participant;
Z is the spot price;
A is the lower tolerance level; and
B is the upper tolerance level Calculations and comparisons described in this embodiment may preferably be performed by the currency exchange risk management system 113. The negotiated currency price and tolerance level may be entered into the currency exchange risk management system 113 and stored therein. The currency exchange risk management system 113 can thereby store the currency price and tolerance levels for numerous commerce participants. Pricing criteria for each participant can be completely independent of other arrangements a financial institution may have made. When the transaction facilitator system 208 notifies the currency exchange risk management system 113 of a transaction, the currency exchange risk management system 113 can perform the necessary calculations and present the currency amounts to various interested parties.

In one embodiment, the currency exchange system 113 can continuously monitor spot price and adjust the currency price when the delta exceeds a predetermined tolerance, such as 10%. In another embodiment, the currency exchange risk management system 113 can determine a spot price at the time of a transaction and compare it with the negotiated tolerance levels for the particular commerce participant involved. If the spot price is within the tolerance levels negotiated for that commerce participant, the currency exchange risk management system 113 will notify the transaction facilitator 208 to complete the transaction. If, however, the spot price is above or below the tolerance levels negotiated for that commerce participant, the currency exchange risk management system 113 will either recalculate the currency price, or notify the financial institution and the commerce participant that the currency price should be renegotiated. Once the currency price has been recalculated or re-negotiated, and the modified currency price has been entered into the currency exchange risk management system 113, the system will complete the transaction using the modified currency price.

To allow the smooth flow of operations for the e-commerce participant and its customers, it may be desired to prevent transactions from being stalled while the currency exchange risk management system 113 waits for the financial institution and the commerce participant to re-negotiate the currency price. To avoid such delays the currency exchange risk management system 113 can be programmed such that, by way of example, in the event the spot price exceeds the negotiated tolerance level, the system 113 will allow the transaction to be completed, but at the spot price instead of the negotiated currency price. Alternatively, the system 113 may be programmed to compute a modified currency price, based upon parameters previously set by the financial institution and the commerce participant, and to complete the transaction at the modified currency price.

By way of example only, a currency exchange institution and an e-commerce participant can negotiate an exchange price of 100 Japanese Yen per 1 United States Dollar ("USD"), with a 10% tolerance level. If the spot price for Japanese Yen rises to 105 Japanese Yen per 1 USD, then the exchange rate between the currency exchange institution and the e-commerce participant will remain at 100 Yen per 1 USD, since the spot price is within the 10% tolerance level. If, however, the spot price for Japanese Yen should further rise to 112 Yen per 1 USD, then the spot price will have exceeded the tolerance level of 10%, and the currency exchange rate will be re-negotiated. Similar calculations and comparisons may be performed should the spot price of the relevant currency fall below the tolerance level established by the exchange participants.

Participants in the transaction should not need to wait for the occurrence of a transaction before determining if the currency price is within the negotiated tolerance levels. The spot price for the relevant currency may be determined at periodic intervals, as often as the parties to the transaction deem necessary. In a highly volatile currency market, the spot price may be monitored more frequently to more accurately reflect the changing price for the currency. Additionally, in a highly volatile market, the currency exchange rate may require more frequent re-negotiation. Conversely, in a more stable currency exchange market, the spot price need not be determined as often, since the currency exchange rate will not be expected to require amendment as often as in a volatile market. Monitoring the spot price on a periodic basis may eliminate the need to perform such calculations when a new transaction arises, and thus allows the transaction to be completed without delay.

The tolerance levels set by the currency exchange institution and the e-commerce participant need not be identical for rising spot prices and falling spot prices. For example, should the parties be more concerned with the movement of the spot price in one direction than the other, they may institute a higher tolerance level for fluctuations in one direction, and less tolerance for fluctuations in the other direction. In such a situation, the currency exchange price can be calculated as follows:

$$X=Y \text{ if } A \leq Z \leq B \text{ and } A \neq B$$

where:
X is the currency price;
Y is the currency price negotiated by the financial exchange institution and the e-commerce participant;
Z is the spot price;
A is the lower tolerance level; and
B is the upper tolerance level Additionally, the tolerance level may be set for only one direction of spot price movement. For example, the financial institution and the commerce participant could negotiate that the currency price be held constant should the spot price rise, but the currency price be re-negotiated should the spot price fall below a predetermined level. Conversely, the participants could agree to re-negotiate the currency price should the spot price rise above a predetermined level and held constant should the spot price fall below the negotiated currency price.

It will be understood by those in the art that in each embodiment disclosed herein, instead of modifying the currency price when the spot price exceeds a negotiated tolerance level, the tolerance level may be changed or re-negotiated by the participants to the transaction. To implement this invention, it is preferable to have a predetermined equation for determining the currency price, and a predetermined tolerance above, and a predetermined tolerance below the currency price.

In one embodiment, a foreign exchange currency exchange risk management system 113 can include a live pricing feed and be integrated into a back-end technological infrastructure. The financial institution can provide competitive foreign exchange rates directly to portals. The portals and exchanges can, in turn, present the rates to a purchaser 112 and a seller 110 via the financial institution's site.

A currency exchange risk management system 113 can lower costs and reduce risks connected with cross-border transactions. Additionally, this technology can be integrated into a B2B company's existing back-end infrastructure. A scalable architecture can allow a participant to begin with limited services and progress to include a full-scale solution that handles credit, foreign exchange conversion, transaction settlement, and logistics.

A currency exchange risk management system 113 can present to users of B2B exchanges and portals both bid and ask prices in their local currencies, regardless of what country a supplier 110 or a purchaser 112 on the opposite side of the transaction is located. These prices can be programmed to adjust in real-time via a live pricing feed, or set for a predetermined period of time.

Referring now to FIG. 3a, a U.S. based supplier can post an asking price 306, such as, for example USD 1 million for X widgets. A purchaser 112, such as a European buyer 301, a Korean buyer 302, an Australian buyer 303, a Canadian buyer 304, or a British buyer 305 can view a price posted in a local currency 311, as well as an FX rate 312 and the price converted to another currency, such as U.S. Dollars 313.

A buyer 301-305 can also post an offer to buy in the buyer's 301-305 local currency 311, which can be automatically converted such that the supplier can view the prices only in USD 313, or perhaps USD and the seller's currency, which can be, by way of non-limiting example, the buyer's 301-305 local currency 311 or USD 313. A supplier may be able to benefit from such automatic viewing, as the supplier can easily determine which purchaser 301-305 is offering a price most favorable in USD terms.

Similarly, a purchaser 112 can see supplier prices 314 converted from a currency of choice of the supplier 314, to a currency of the purchaser's choice, such as USD 315. One embodiment, including multiple sellers 110 allows the purchaser 112 to display multiple offers for sale 314 wherein the offers can originate in a currency chosen by each supplier and displayed in a currency chosen by the purchaser 315. In this manner, a relative cost of goods can include the price of foreign exchange. A single interface can include multiple prices for ease of comparison.

Referring now again to FIGS. 3a and 3b, examples are also illustrative of an interface fed by a live pricing mechanism, such as a data feed. Live prices can continuously fluctuate via the live pricing feed, and thus, so would the bid and ask prices on site users' screens. In addition, the currency exchange risk management system 113 could present the feel of an exchange trading floor. A purchaser 112 and a supplier can be brought closer on pricing discrepancies.

Figure 4:
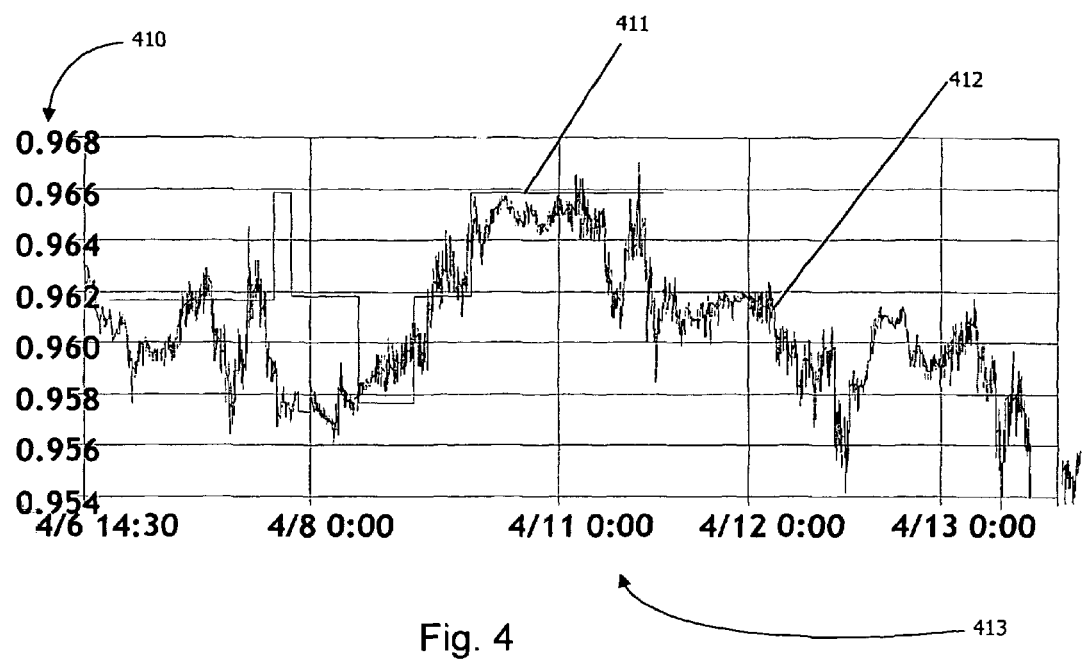
FIG. 4 illustrates a graphical representation of a method of determining an currency price tolerance.

Referring now to FIG. 4, foreign currency prices can be adjusted according to an established series of daily "fixes" made for a currency pair. Prices which are shown to participants can remain constant so long as a related foreign exchange rate remains within a pre-determined number of pips on either side of the price fix. If the foreign exchange rate moves out of that band, the price shown to a purchaser 112 and a seller 110 would shift to reflect a new band. The result can be a step like a series of price bands rather than constantly fluctuating prices.

In the example illustrated, a price band 411 tracks live data 412 of a currency. The price band can sometimes reflect a better price than the currency rate. However, when the currency rate moves outside a pre-determined number of pips on either side of the price fix, in this case 0.962, the FX rate shown to customers will shift higher or lower to a new fixed band, reflecting an underlying movement in the currency. Therefore, live price can be displayed within pre-specified bands and prices would shift on a participant's screens as prices moved outside the pre-determined bands.

Figure 5:
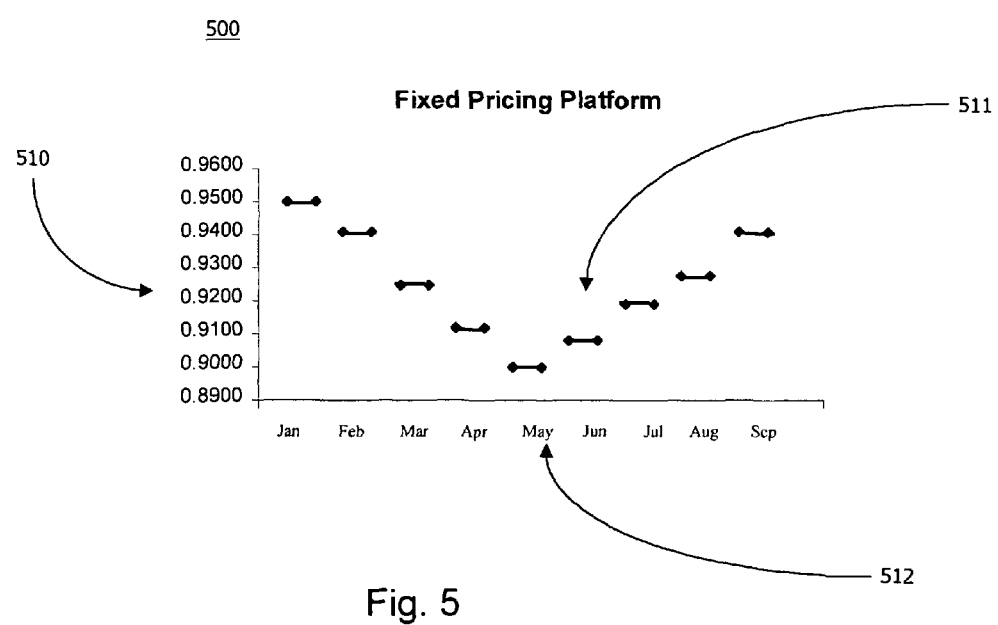
FIG. 5 illustrates a graphical representation of another method of determining an currency price tolerance.

Referring now to FIG. 5, in another embodiment, a bank or other financial institution can fix a series of rates 511 for a currency pair, each rate a negotiated or otherwise determined price 510. The series of rates 511 would then remain valid for a fixed period of time 512, such as, one week, one month or one quarter. The rates can be sent to a B2B or B2C company at the beginning of the appropriate time period, and the company can use these rates to set prices on their goods in a consumer's local currency. During the course of each day, the company can send the financial institution the foreign currency flows as the flows are received. At the end of the fixed period of time, a block amount can be sent to the company in the company's local currency.

The aforementioned embodiments of the invention allow a risk management system 113 to assist internet portals facilitate economic transactions between e-commerce participants using local currencies which are distinct to each participant. When a seller 110 transacts commerce in one currency, the purchaser 112 in a second currency, and the e-commerce portal or other transaction facilitator in a third, a mechanism has been established to provide price and other financial information to each market participant in its own currency.

The present invention can provide currency information to each of the market participants in the participant's local currency. The information in local currency of the purchaser 112 can be first converted to the local currency of the e-commerce portal. In addition, the information can be converted from the currency of the e-commerce portal to that of the local currency of the purchaser 112. Conversely, information from the purchaser 112 can be converted to the currency of the e-commerce portal, and also to the currency of the seller. This dual conversion system allows each participant to the transaction to view the relevant price information in his local currency. An additional aspect of the current invention allows each party to view relevant price information not only in his own currency, but also in the currency of other market participants. A further embodiment allows a market participant to compare price information of several market participants at once, thereby enabling the participant to select the most advantageous transaction.

Figure 6:
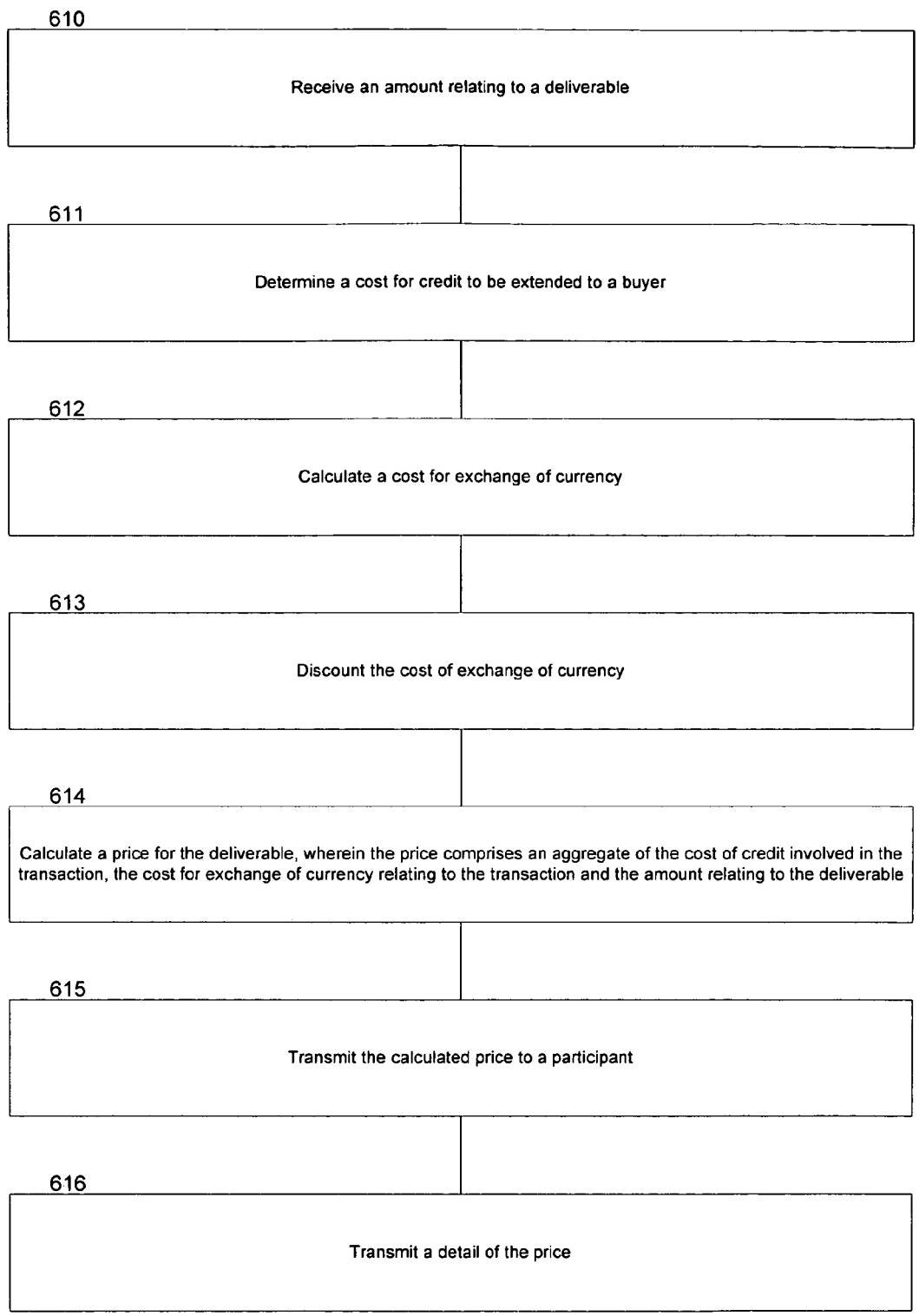
FIG. 6 illustrates an exemplary flow of a method for determining a price of a deliverable related to an online transaction.

Referring now to FIG. 6, the present invention can also address other aspects of an online transaction and combine those aspects with online management of risk associated with foreign exchange of currency. For example, the currency risk management system 113 can receive an amount relating to a deliverable 610. A deliverable can be a good, service, currency, financial instrument, security, data, license, or other transferable. The amount related to the deliverable can include the amount the purveyor or seller will receive for the deliverable, such as the cost of a good. Generally, the currency risk management system 113 will receive the amount via a data signal that can be fed directly into the system. Alternatively, the amount can be entered with an input device into the currency risk management system 113. For example, the amount may be conveyed to an operator with access to a network access device via a voice message, hardcopy, fax, e-mail or other medium, and subsequently entered with a keyboard, pointing device, or via voice recognition. Other methods of inputting the amount can also be utilized if desired.

A cost of credit that will be extended to a buyer can be determined 611 according to known practices and/or jurisdictional restrictions related to credit. For example, the size of the transaction, the period allowed until repayment, the rate of interest, the credit history of the buyer, the volume of business the buyer transacts and other factors can be considered in calculating the cost of credit. Similarly, a cost for an exchange of currency can also be calculated 612. A cost for exchange of currency can be based upon factors such as, the currencies involved, market data, the relationship between the buyer and the financial institution providing the currency exchange, an aggregate volume of currency exchange, the amount of the associated transaction, and/or other related factors.

In addition, a discount on the cost for the exchange of currency can also be calculated 613. Discounts can be determined according to a volume of business of one or both participants, by agreement with a transaction facilitator 111, by agreement with a participant or other interested party, or by other criteria. The discounted cost of exchange of currency can be incorporated into the calculation for the price of the deliverable 614.

The price of the deliverable can be calculated 614 to include an aggregate or sum of the cost of credit involved in the transaction, the cost for exchange of currency relating to the transaction and the amount relating to the deliverable.

The exchange server can also be used to accept an application for credit. A line of credit can be issued via the currency exchange server and the credit utilized to conduct online transactions. Credit that is extended through the currency exchange server can be categorized according to criteria relating to a transaction participant, the terms of the credit, the type of transaction and/or almost any other data relating to its issuance. If desired, the category that is assigned to the issued credit can be utilized as a factor determining the terms of the credit. In addition, issued credit can be aggregated and sold to other interested financial institutions.

Different embodiments of the present invention can include incorporating a cost of credit into a foreign exchange price, or into the price of a deliverable involved in the transaction. A deliverable can include a good, service, financial instrument, currency, real estate, contract, or other valuable that is marketed or otherwise presented for transaction via a network. The price for the deliverable can include those costs attributable to the deliverable's procurement.

One exemplary flow of steps that can be used to accomplish functionality associated with issuing online credit and managing risk includes receiving an amount into the currency exchange system that relates to a deliverable of a transaction that may be executed 610. The exchange server can calculate a cost for credit that may be extended to a participant of the transaction 611. Cost for credit can include factors associated with a participant of the transaction, the deliverable, the terms or other associated criteria. Examples of factors can include the risk associated with the participant, the amount of the credit, the volume of business a credit provider conducts with the participant, a payment history associated with the participant, the type of deliverable, collateral for the credit, or any other pertinent information.

Referring now again to FIG. 6, the calculated price for the deliverable can be transmitted to a participant of the transaction 615. Preferably transmission is accomplished via a communications network 200. Alternatively, transmission can be accomplished via a voice line, fax, or other means of communication. If it is desired, a detailed breakdown of the transmitted price can also be transmitted 616. The detail can include each element involved in calculating the price for the deliverable.

Figure 7:
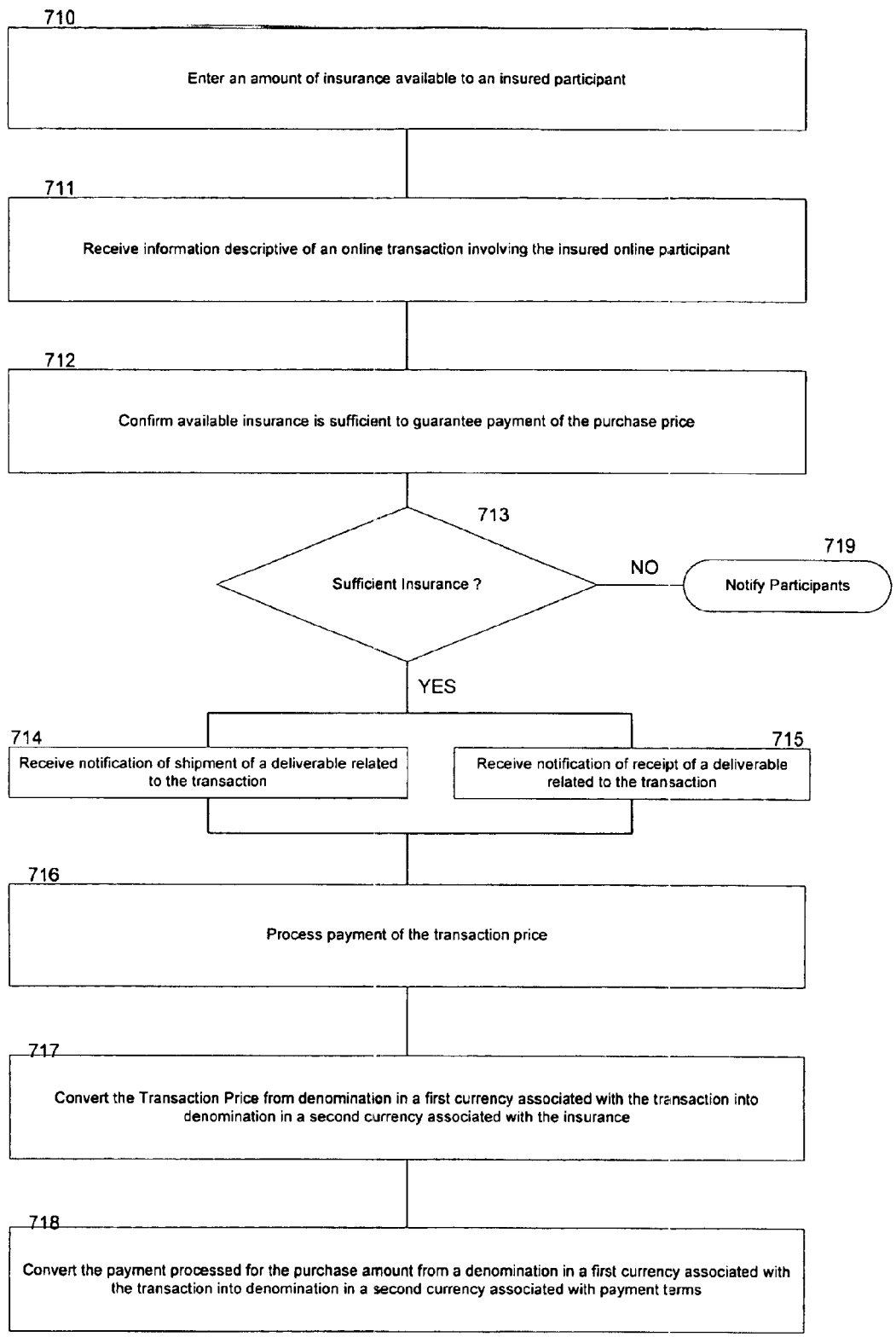
FIG. 7 illustrates an exemplary flow of a method for incorporating insurance into a online transaction.

Referring now to FIG. 7, the automated online sales risk management system can also incorporate managing insurance related to a participant in the transaction. An amount of insurance available to an insured participant can be entered into the system 710. The system can receive information descriptive of an online transaction involving the insured participant 711. Receipt of the information can cause the system to confirm that available insurance is sufficient to guarantee payment of the purchase price 712. If the insurance is not sufficient 713, the currency risk management system 113 can notify the participants 719. One, or both participants may then terminate the transaction if desired. If the insurance is sufficient, the currency risk management system 113 can wait to receive notification of a next step. In one embodiment, the amount of insurance can be a notional amount variable over time.

A next step can include receiving notification of shipment of a deliverable related to the transaction 714 and/or receiving notification of receipt of a deliverable related to the transaction 715. Upon receipt of the proper notification 714, 715, the system can process payment of the transaction amount 716. Payment processing can include electronic transfer of funds, generating a message which will cause the payment to occur or other payment methodologies.

In one embodiment, the transaction price can be converted from a denomination in a first currency that is associated with the transaction into a denomination in a second currency that is associated with the insurance 717. In addition, the payment process can include the conversion of the purchase amount from a denomination in a first currency associated with the transaction into a denomination in a second currency associated with payment terms 718.

Figure 8:
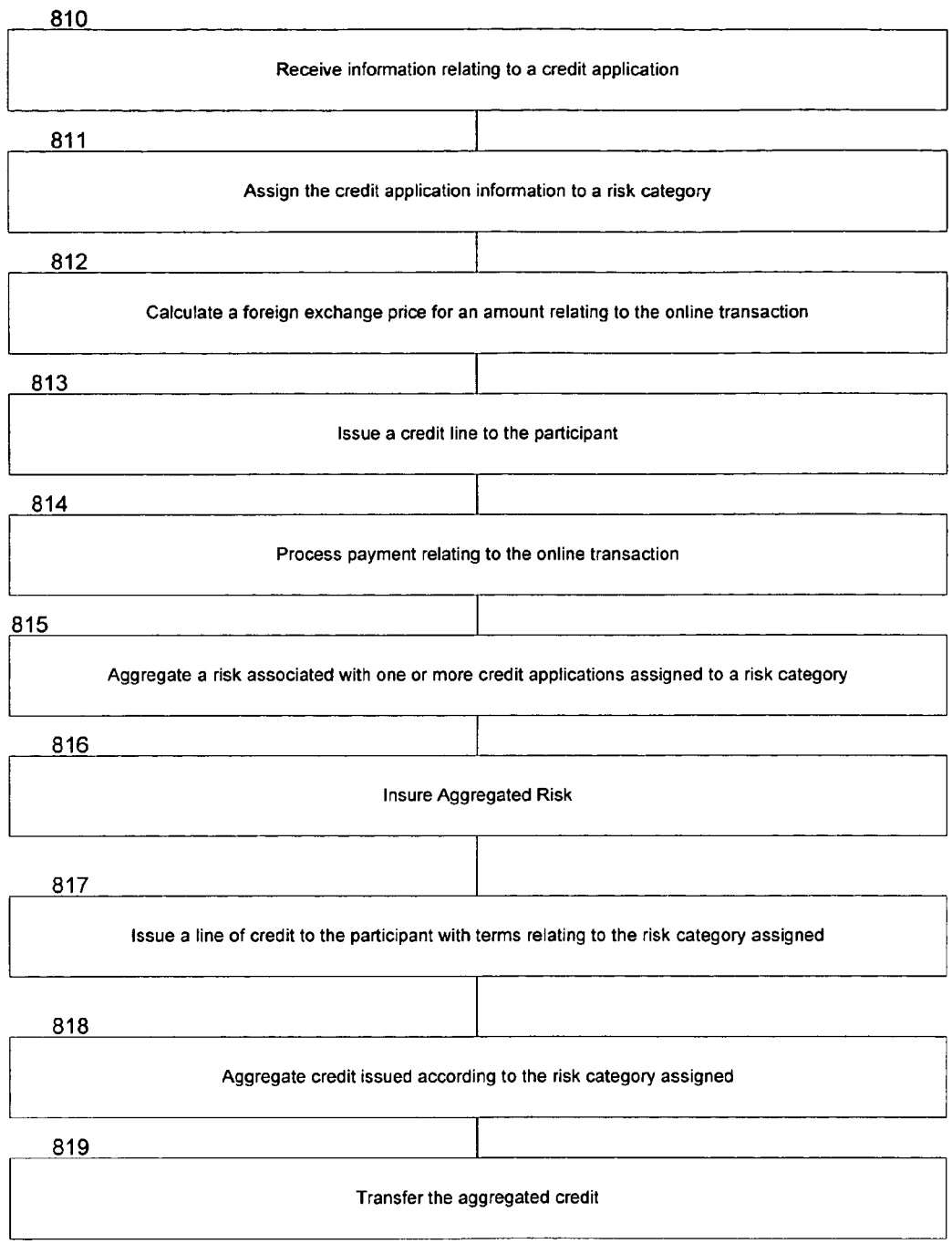
FIG. 8 illustrates an exemplary flow of a method for processing credit risk associated with online transactions.

Referring now to FIG. 8, another embodiment of the current invention can include aggregating risk related to online transactions and insuring the aggregated risk. One method that can be used to accomplish the insurance of aggregated risk, can include receiving information related to a credit application 810. The credit application information can be assigned to a risk category 811. A foreign exchange price for an amount related to an online transaction can be calculated 812 and a credit line can be issued to the participant 813. Payment related to the online transaction can also be processed 814. Risk associated with one or more credit applications that are assigned to a risk category can be aggregated 815 and the aggregated risk can be insured 816. A line of credit to the participant which includes terms relating to the risk category assigned can also be issued 817. The credit issued can be aggregated according to the risk category assigned 818 and the aggregated credit can be transferred using processes, methods and terms well known for the transfer of credit and risk 819.

It will be well known to those in the art that the represented dispersed computer communications network depicted in FIG. 2 can take many forms and include many network architectures, as previously described. It will also be well known that the two networks shown in FIG. 2 may easily be described as one network, with dispersed computer connections. The network is drawn as it is simply to highlight the distinct currencies in which the commerce participants are operating.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired. In any case, the language may be a compiled or interpreted language. Suitable processors include, by way of example, both general and special purpose microprocessors.

Computers 201-208 involved in the present invention may be connected to each other by one or more network interconnection technologies. For example, dial-up lines, token-ring and/or Ethernet networks, T1 lines, asynchronous transfer mode links, wireless links, digital subscriber lines (DSL) and integrated service digital network (ISDN) connections may all be combined in the network. The internet protocol can be adhered to and other packet network and point-to-point interconnection technologies may also be used. Additionally, the functions associated with separate processing and database servers in the exchange server 207, the transaction facilitator system 208, or other computers may be integrated into a single server system or may be partitioned among servers and database systems that are distributed over a wide geographic area.

A number of embodiments of the present invention have been described. Nevertheless, it will be understood that various modifications may be made without departing from the spirit and scope of the invention. For example, computers 201-206 can comprise a personal computer executing an operating system such as Microsoft Windows™, Unix™, or Apple MacOS™, as well as software applications, such as a web browser. Computers 201-206 can also be terminal devices, or palm-type computer WEB access devices that adhere to a point-to-point or network communication protocol such as the Internet protocol. Other examples can include TV WEB browsers, terminals, and wireless access devices (such as a 3-Com Palm organizer). A customer computer may include a processor, RAM and/or ROM memory, a display capability, an input device and hard disk or other relatively permanent storage. Accordingly, other embodiments are within the scope of the following claims. Similarly, the transaction facilitator 208 and the currency exchange system 207 can be any computer system known to those skilled in the art.

What is claimed is:

1. A computer-implemented method for managing a sales risk, comprising:

receiving on a computer multiple parameters including a negotiated currency exchange price and first and second negotiated tolerance levels for an e-commerce transaction;

monitoring a currency exchange spot price via a live pricing feed;

adjusting via the computer the currency exchange price in real-time based on the monitored currency spot price and the negotiated tolerance levels for a particular commerce participant, wherein the adjusting includes:

determining if the currency spot price exceeds or falls below the negotiated tolerance levels;

modifying the negotiated tolerance levels based on the determination; and re-calculating the currency exchange price using a predetermined equation based on the modified tolerance levels to determine the adjusted currency exchange price; and allowing the transaction to proceed with the adjusted currency exchange price.

2. The computer-implemented method as recited in claim 1, wherein receiving via the computer the multiple parameters includes receiving one or more of:

a sales price for a good or service of the e-commerce transaction;

a current price for each of a plurality of currencies;

a cost for an exchange between two of the plurality of currencies;

a cost of credit to be extended to a buyer of the good or service;

a sales risk of the e-commerce transaction;

an amount of insurance to cover the sales price;

a cost for the amount of insurance; or a shipping or handling cost.

3. The computer-implemented method as recited in claim 1, further comprising receiving one or more real-time feeds of changing input values, wherein each real-time feed provides a dynamic input value for calculating via the computer at least some of the multiple parameters.

4. The computer-implemented method as recited in claim 3, wherein receiving via the computer the one or more real-time feeds includes receiving a feed of a dynamic input value selected from a list of dynamic input values:

a fluctuating exchange factor between two of the plurality of currencies;

a fluctuating value of the good or service being transacted;

a fluctuating spot price of one of the plurality of currencies;

a renegotiable currency price;

a fluctuating tolerance level for one of the parameters;

a fluctuating creditworthiness of the buyer;

a fluctuating volume discount factor;

a fluctuating buyer discount factor;

a fluctuating time window for the e-commerce transaction;

a fluctuating sales volume history of the good or service;

a fluctuating volume of business of the buyer;

a fluctuating competing bid;

a fluctuating procurement cost of the good or service;

a fluctuating risk associated with the buyer or seller;

a fluctuating payment history;

a current type or designation of the good or service; and a fluctuating amount of collateral.

5. The computer-implemented method as recited in claim 1, wherein a sales price parameter partly determines and is partly determined by a risk of transaction parameter;

wherein the risk of transaction parameter partly determines and is partly determined by an amount of insurance parameter;

wherein the sales price parameter partly determines and is partly determined by the amount of insurance parameter; and wherein the sales price parameter is partly determined by a price of currency parameter.

6. The computer-implemented method as recited in claim 1, wherein a cost of credit parameter partly determines and is partly determined by a sales price parameter;

wherein the cost of credit parameter is partly determined by a creditworthiness parameter; and wherein the sales price parameter is partly determined by the creditworthiness parameter.

7. The computer-implemented method as recited in claim 1, wherein:

a spot currency price changes a sales price for a good or service of the e-commerce transaction;

a currency exchange cost changes the sales price;

a cost of credit changes the sales price;

a sales risk of the e-commerce transaction changes the sales price;

an amount of insurance to cover the good or service changes the sales price;

a shipping or handling cost changes the sales price; and the sales price changes the currency exchange cost, the cost of credit, the sales risk, the amount of insurance, and the shipping and handling cost.

8. The computer-implemented method as recited in claim 1, further comprising:

determining via the computer a cost for credit to be extended to a participant of the e-commerce transaction, wherein the credit is extended based upon one or more of the parameters comprising a volume of business a credit provider conducts with a participant, a type of deliverable and collateral for the credit;

calculating via the computer a cost for exchange of a first currency to a second currency, wherein the cost of exchange is based upon one or more of the parameters comprising currencies involved in the transaction, an aggregate volume of currency exchanged by the participant and an amount of the associated transaction, and is effective for a predetermined period of time; and calculating via the computer an aggregate price to the customer for the deliverable, wherein the aggregate price comprises an aggregate of the cost of credit, the cost for exchange of currency and an amount of the first currency relating to a price of the deliverable.

9. The computer-implemented method of claim 8 additionally comprising transmitting via the computer the calculated aggregate price to a network access device associated with a participant in the transaction, wherein the aggregate price is converted to an amount and units of the participant's type of currency.

10. The computer-implemented method of claim 9 additionally comprising transmitting via the computer to the network access device, a detail of the aggregate price, wherein the detail comprises:

the cost of credit, based upon the amount of currency involved in the transaction, the period allowed until repayment, the rate of interest, and the volume of business the participant transacts;

the cost for exchange of currency; and the amount of a currency relating to the price of deliverable.

11. The computer-implemented method of claim 10 additionally comprising discounting via the computer, the cost for exchange of currency according to a volume discount parameter relating to an aggregate business volume associated with a participant in the transaction.

12. A non-transitory computer-readable media storing computer-executable instructions to:

receive multiple parameters including a negotiated currency exchange price and a first and second negotiated tolerance levels for an e-commerce transaction;

monitor a currency exchange spot price via a live pricing feed;

adjust the currency exchange price in real-time based on the monitored currency exchange spot price and the negotiated tolerance levels for a particular commerce participant, wherein the instructions to adjust include instructions to:

determine if the spot price exceeds at least one of the negotiated tolerance levels;

modify the negotiated tolerance levels based on the determination; and re-calculate the currency exchange price using a predetermined equation based on the modified tolerance levels to determine the adjusted currency exchange price; and allow the transaction to proceed with the adjusted currency exchange price.

13. A non-transitory computer-readable media as recited in claim 12, wherein the receiving the multiple parameters includes instructions for receiving one or more of: a sales price for a good or service of the e-commerce transaction; a current price for each of the multiple currencies; a cost for an exchange between two of the multiple currencies; a cost of credit to be extended to a buyer of the good or service; a sales risk of the e-commerce transaction; an amount of insurance to cover the sales price; a cost for the amount of insurance; and a shipping or handling cost.

14. A non-transitory computer-readable media as recited in claim 12, further includes instructions to: processing one or more real-time feeds of changing input values, wherein each real-time feed provides a dynamic input value for calculating at least some of the multiple interrelated parameters.

15. A non-transitory computer-readable media as recited in claim 14, wherein the instructions to process the one or more real-time feeds includes instructions for processing a feed of a dynamic input value selected from the list of dynamic input values: a fluctuating exchange factor between two of the multiple currencies; a fluctuating value of the good or service being transacted; a fluctuating spot price of one of the currencies; a renegotiable currency price; a fluctuating tolerance level for one of the parameters; a fluctuating creditworthiness of a buyer; a fluctuating volume discount factor; a fluctuating buyer discount factor; a fluctuating time window for the e-commerce transaction; a fluctuating sales volume history of the good or service; a fluctuating volume of business of a buyer; a fluctuating competing bid; a fluctuating procurement cost of the good or service; a fluctuating risk associated with a buyer or seller; a fluctuating payment history; a current type or designation of the good or service; and a fluctuating amount of collateral.

16. A non-transitory computer-readable media as recited in claim 15, further comprising iteratively re-calculating the multiple parameters a sufficient number of times to obtain a stable value within a threshold for each of the multiple interrelated parameters, in response to receiving a change in one of the dynamic input values.

17. A computerized system, comprising:
means for receiving multiple parameters including a negotiated currency exchange price and first and second negotiated tolerance levels for an e-commerce transaction;
means for monitoring currency exchange spot price via a live pricing feed;
means for adjusting the currency exchange price in real-time based on the monitored currency exchange spot price and the negotiated tolerance levels for a particular commerce participant, wherein the means for adjusting further includes:
    means for determining if the spot price exceeds at least one of the negotiated tolerance levels;
    means for modifying the negotiated tolerance levels based on the determination; and
    means for re-calculating the currency exchange price using a predetermined equation based on the modified tolerance levels to determine the adjusted currency exchange price; and
means for allowing the transaction to proceed with the adjusted currency exchange price.

* * * * *